United States Patent Office 3,275,647
Patented Sept. 27, 1966

3,275,647
PHOSPHORUS ESTERS OF HYDROXY-1,2,3-BENZO-THIADIAZOLES
Johannes Th. Hackmann, Enschede, Netherlands, and Peter Kirby, Maidstone, England, assignors to Shell Oil Company, New York, N.Y., a corporation of Delaware
No Drawing. Filed Dec. 6, 1965, Ser. No. 512,019
Claims priority, application Great Britain, Dec. 8, 1964, 49,894/64
8 Claims. (Cl. 260—304)

This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

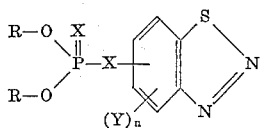

wherein each R represents alkyl of from 1 to 4 carbon atoms, each X represents oxygen or sulfur, $n$ is zero or one, and Y is halogen—that is, chlorine or bromine.

In this specification, these compounds will be named as substituted 1,2,3-benzothiadiazoles, in accordance with the conventional numbering system:

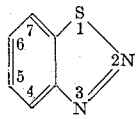

The organophosphorus moiety can be bonded at any of the carbon atoms at the 4-, 5-, 6- and 7-positions in the ring, and the halogen substituent can be bonded at any of the other three carbon atoms. In the unsubstituted compounds ($n=0$), it may be preferable from the standpoint of over-all insecticidal activity that the organophosphorus moiety be bonded to the carbon atom at the 6-position in the ring, since species of the compounds of the invention having this configuration appear to have the highest level of insecticidal activity, generally. The general level of insecticidal activity appears to diminish with configurations in which the organophosphorus moiety is bonded to the carbon atoms at the 5- and 7-positions in the ring, respectively. In the substituted compounds ($n=1$), also from the standpoint of general insecticidal activity, it is to be preferred that the halogen, Y, not be in vicinal configuration with respect to the organophosphorus moiety, the preferred configuration being that in which the organophosphorus moiety and the halogen are in para-configuration (organophosphorus moiety in 7- (4-) position; Y being in 4- (7-) position), since this apparently confers the highest general insecticidal activity.

Because they are easier to manufacture and cost less, the unsubstituted compounds ($n=0$) may be preferred. The general character of these compounds is illustrated by the thirteen species whose preparation and testing as insecticides is described in the working examples. In addition, the following species further illustrate the general class:

6-chloro-7-(dimethoxyphosphinothioyloxy)-1,2,3-benzo-thiadiazole;
5-chloro-6-(dimethoxyphosphinothioyloxy)-1,2,3,-benzo-thiadiazole;
4-(dimethoxyphosphinothioyloxy)-1,2,3-benzothiadiazole;
4-(dimethoxyphosphinyloxy)-1,2,3-benzothiadiazole;
5-chloro-4-(dimethoxyphosphinothioyloxy)-1,2,3-benzo-thiadiazole;
5-bromo-4-(dimethoxyphosphinyloxy)-1,2,3-benzothiadi-azole;
7-chloro-4-(dimethoxyphosphinothioyloxy)-1,2,3-benzo-thiadiazole;
4-bromo-5-(dimethoxyphosphinothioyloxy)-1,2,3-benzo-thiadiazole;
6-chloro-5-(dimethoxyphosphinyloxy)-1,2,3-benzothiadi-azole;
7-chloro-4-(dimethoxyphosphinothioyloxy)-1,2,3-benzo-thiadiazole;
6-chloro-4-(dimethoxyphosphinothioyloxy)-1,2,3-benzo-thiadiazole;
7-chloro-5-(dimethoxyphosphinothioyloxy)-1,2,3-benzo-thiadiazole.

These novel compounds can be prepared by techniques known to the chemical art for the phosphorylation of a hydroxy- or mercapto-1,2,3-benzothiadiazole. Thus, these compounds may be prepared by a process which comprises reacting the appropriate phosphoric or thiophosphoric acid chloride with the appropriate hydroxy- or mercapto-1,2,3-benzothiadiazole in the presence of a base. The base may be pyridine, a lower trialkylamine in which the alkyl groups contain 1–5 carbon atoms, such as triethylamine, or, and preferably, an alkali metal carbonate, such as potassium carbonate. If desired a copper catalyst may be used to increase the reaction rate.

A modified version of the above process comprises reacting the appropriate phosphoric or thiophosphoric acid chloride with an alkali metal derivative of a hydroxy- or mercapto-1,2,3-benzothiadiazole. The alkali metal derivative may be for example the sodium or potassium derivative which may be prepared for example by reacting substantially equivalent quantities of the 1,2,3-benzothiadi-azole with an alkali metal hydroxide.

The above processes are suitably carried out in an inert organic reaction medium, such as benzene, toluene, xylene, actone or, preferably, methyl isobutyl ketone. It has been found that reaction between the starting components is best carried out at room temperatures or slightly elevated temperatures, e.g. up to 160° C.

The starting materials in the process of the invention may be prepared according to the following methods known in the literature.

(i) 5-hydroxy-1,2,3-benzothiadiazole may be prepared according to the method of Fries (Annalen, 454, 176) which essentially comprises diazotisation of 4-nitro-2-aminothiophenol, cyclization of the diazotisation product to give 5-nitro-1,2,3-benzothiadiazole, and replacement of the nitro group by a hydroxy group using the usual reduction, diazotisation and hydrolysis procedures;

(ii) 6-hydroxy-1,2,3-benzothiadiazole may be prepared according to the method of Ward et al. (J. Chem. Soc., 2374, 1962) which is substantially the same as method (i) but employs 5-nitro-2-aminothiophenol as starting material.

Hydroxy-1,2,3-benzothiadiazoles may also be prepared according to the novel process disclosed in our co-pending application Serial No. 511,318 filed December 3, 1965, which essentially comprises diazotisation of an aminobenzothiazole followed by hydrolysis of the diazotised product.

Where halogenated hydroxy-1,2,3-benzothiadiazoles are required as starting materials, they may be obtained by direct halogenation of hydroxy-1,2,3-benzothiadiazoles.

The novel compounds according to the invention and the methods by which they are prepared are illustrated by the examples that follow in which parts by weight (w.) and parts by volume (v.) bear the same relation as the kilogram to the litre.

EXAMPLE I a. *Preparation of 5-(dimethoxyphosphinothioyloxy)-1,2,3-benzothiadiazole*

5-hydroxy-1,2,3-benzothiadiazole was prepared according to the method of Fries (Annalen, 454, 176).

The hydroxy compound (0.5 w.) was dissolved in ethanol (50 v.) and aqueous alcoholic potassium hydroxide (0.182 w.) added to the ethanol solution. The mixture was refluxed for one hour. The solvent was stripped off, benzene was added and the mixture refluxed in a Dean-Stark apparatus until water ceased to be evolved. The benzene was removed by distillation, dimethyl phosphorochloridothionate (0.58 w.) was added to the residue and the mixture refluxed in methyl isobutyl ketone (50 v.) for several hours. After cooling the precipitated potassium chloride was filtered from the reaction mixture and the resulting solution stripped of solvent. The residue was dissolved in ether and washed several times with sodium bicarbonate solution and finally with water. The ethereal solution was dried over magnesium sulfate and then filtered. The ether was removed by distillation leaving a crude product (0.8 w.). The product was purified on a silica gel column using dichloromethane, the eluent was collected, the solvent removed, and the residue stripped of solvent under high vacuum. The desired product, M.P. 60–61° C., was obtained in 65% yield.

*Analysis* (percent by weight).—Found: C 34.6; H 3.1; S 23.4; P 11.6%. $C_8H_9N_2O_3PS$ requires: C 34.8; H 3.3; S 22.5; P 11.2%.

The following compounds were prepared in a similar fashion:

b. 5-(diethoxyphosphinyloxy) - 1,2,3-benzothiadiazole (from diethyl phosphorochloridate), yellow oil.

*Analysis* (percent by weight).—Found: C 41.9; H 4.5; P 10.2; S 11.2%. $C_{10}H_{13}N_2O_4PS$ requires: C 41.7; H 4.5; P 10.7; S 11.1%.

c. 5-(diethoxyphosphinothioyloxy) - 1,2,3,-benzothiadiazole (from diethyl phosphorochloridothionate), colorless crystals, M.P. 47–49° C.

*Analysis* (percent by weight).—Found: C 40.6; H 4.6; P 10.0; S 20.5%. $C_{10}H_{13}N_2O_3PS_2$ requires: C 39.5; H 4.3; P 10.2; S 21.1%.

EXAMPLE II a. *Preparation of 6 - (dimethoxyphosphinothioyloxy) - 1,2,3-benzothiadiazole*

6-hydroxy-1,2,3,-benzothiadiazole was prepared by the method of Ward et al. (J. Chem. Soc. 2374–9, 1962).

The hydroxy compound (1.04 w.) in aqueous industrial methylated spirit was refluxed with a solution of potassium hydroxide (0.383 w.) in aqueous industrial methylated spirit for 30 minutes. The solvent was stripped off. Benzene (100 v.) was added to the aqueous potassium salt and the mixture was refluxed in a Dean-Stark apparatus until no more water was evolved. The benzene was stripped off. Methyl isobutyl ketone (50 v.) and dimethyl phosphorochloridothionate (1.1 w.) were added and the mixture refluxed for 4 hours. The reaction mixture was filtered, the solvent removed and the residue dissolved in ether, washed several times with sodium bicarbonate solution and finally with water. The ethereal solution was dried over anhydrous magnesium sulfate. The ether was evaporated off, finally under high vacuum, leaving 1.45 w. crude product. The product dissolved in dichloromethane was passed down a silica gel column. The eluate was collected and the solvent removed, leaving colorless crystals of 6-(dimethoxyphosphinothioyloxy)-1,2,3,-benzothiadiazole (0.2 w.), M.P. 38° C.

*Analysis* (percent by weight).—Found: C 35.0; H 3.4; P 11.5; S 23.5%. $C_8H_9N_2O_3PS_2$ requires: C 34.8; H 3.3; P 11.2; S 23.3%.

In the same way the following compounds were prepared:

b. 6-(diethoxyphosphinyloxy) - 1,2,3-benzothiadiazole (from diethyl phosphorochloridate), pale yellow liquid.

*Analysis* (percent by weight).—Found: C 42.4; H 4.9; P 10.2%. $C_{10}H_{13}N_2O_4PS$ requires: C 41.7; H 4.5; P 10.7%.

c. 6-(diethoxyphosphinothioyloxy) - 1,2,3-benzothiadiazole (from diethyl phosphorochloridothionate), colorless crystals, M.P. 39° C.

*Analysis* (percent by weight).—Found: C 39.6; H 4.4; P 10.4; S 21.4%. $C_{10}H_{13}N_2O_3PS_2$ requires: C 39.5; H 4.3; P 10.2; S 21.1%.

EXAMPLE III a. *Preparation of 7-chloro-6-(dimethoxyphosphinothioyloxy)-1,2,3-benzothiadiazole*

6-hydroxy-1,2,3-benzothiadiazole was prepared according to the method described in Example II. 7-chloro-6-hydroxy-1,2,3-benzothiadiazole was prepared by dissolving the hydroxy compound (3.2 w.) in acetic acid (200 v.) and passing chlorine into the solution until sufficient had been adsorbed to achieve monochlorination (1.5 w.). The solution was allowed to stand overnight, the solvent was removed and the residue was washed with benzene, leaving 3.9 w. crude material. Purification on a silica gel column afforded 1.2 w. of the desired product, M.P. 188° C.

The potassium salt of 7-chloro-6-hydroxy-1,2,3-benzothiadiazole was prepared by a method similar to that described in Example II. The potassium derivative (1.39 w.) and dimethyl phosphorochloridothionate (1.03 w.) were reacted together in the same way as described in Example II. The resulting product was purified on a silica gel column using dichloromethane as eluent. The desired product, M.P. 40–42° C., was obtained in 50% yield.

*Analysis* (percent by weight).—Found: C 32.4; H 2.8; P 9.8%. $C_8H_8ClN_2O_3PS_2$ requires: C 30.9; H 2.6; P 10.0%.

In a similar fashion the following compounds were obtained:

b. 7-chloro-6-(diethoxyphosphinyloxy) - 1,2,3-benzothiadiazole (from diethyl phosphorochloridate), pale yellow liquid.

*Analysis* (percent by weight).—Found: C 37.3; H 4.0; Cl 11.8; P 9.2%. $C_{10}H_{12}ClN_2O_4PS$ requires: C 37.2; H 3.7; Cl 11.0; P 9.6%.

c. 7-bromo-6-(dimethoxyphosphinothioyloxy) - 1,2,3-benzothiadiazole (from dimethyl chloridothionate), colorless crystals, M.P. 41° C.

*Analysis* (percent by weight).—Found: C 26.1; H 2.5; P 8.3; Br 23.0%. $C_8H_8BrN_2O_2PS_2$ requires: C 27.1; H 2.3; P 8.7; Br 22.5%.

EXAMPLE IV a. *Preparation of 7-(dimethoxyphosphinothioyloxy)-1,2,3-benzothiadiazole*

7-nitrobenzothiazole (2 w., 0.011 mole), methanol (20 v.), concentrated hydrochloric acid (20 v.) and stannous chloride (10 w., 0.044 mole) were refluxed on a steam bath for 1 hour. Methanol was then removed under reduced pressure and the residue dissolved in water. The solution was made strongly basic with 3 N potassium hydroxide solution and extracted with ether. Evaporation of the dried extract gave 7-aminobenzothiazole, M.P. 115–116° C. Yield 1.1 w. (66%).

*Analysis* (percent by weight).—Found: C 55.7; H 4.2; N 18.5; S 21.1%. $C_7H_6N_2S$ requires: C 55.9; H 4.0; N 18.7; S 21.3%.

7-aminobenzothiazole (2.4 w. 0.016 mole), as prepared by the method described above, was dissolved in concentrated sulfuric acid (50 v.) and the solution cooled to 2–3° C. and stirred. A solution of sodium nitrite (2.0 w., 0.029 mole) in concentrated sulfuric acid (20 v.) was added in one portion and the mixture stirred at 2–3 C. for three hours and then poured onto ice (50 v.). The resulting solution was refluxed for two and a half hours, cooled, diluted with water (200 v.) and extracted with ether. Evaporation of the extract gave 2.0 w. of the crude product. Chromatography on silica gel in methylene dichloride/acetone (95:5 v./v.) gave pure 7-hydroxy-1,2,3-benzothiadiazole, M.P. 233° C. Yield 1.8 w. (74%).

Analysis (*percent by weight*).—Found: C 47.1; H 2.8; S 20.0%. $C_6H_4N_2OS$ requires: C 47.4; H 2.7; S 21.1%.

The hydroxy compound (0.5 w.) was dissolved in ethanol (50 v.) and aqueous alcoholic potassium hydroxide (0.182 w.) added. The mixture was refluxed for one hour. The solvent was stripped from the mixture, benbene added and the mixture refluxed for several hours in a Dean-Stark apparatus until water ceased to be evolved. The benzene was removed by distillation, dimethyl phosphorochloridothionate (0.56 w.) was added to the residue and the mixture was refluxed in methyl isobutyl ketone (50 v.) for several hours. After cooling, the precipitated potassium chloride was filtered from the mixture and the solution stripped of solvent. The residue was dissolved in ether, washed several times with sodium bicarbonate and finally with water and the ethereal solution was dried over magnesium sulfate. The solution was filtered and the solvent was removed by distillation leaving a crude product (0.8 w.). The product was passed down a silica gel column in a solution of methylene dichloride/acetone (98%/2%). The eluent was collected, the solvent was removed, and the residue stripped of solvent under high vacuum, leaving the desired product (0.6 w.), M.P. 68–69° C.

Analysis (*percent by weight*).—Found: C, 35.2; H, 3.4; P, 10.6%. $C_8H_9N_2O_3PS_2$ requires: C, 34.8; H, 3.3; P, 11.2%.

In the same way the following compound was prepared.

b. 7-(diethoxyphosphinyloxy) - 1,2,3 - benzothiadiazole (from diethyl phosphorochloridate), pale yellow liquid.

Analysis (*percent by weight*).—Found: C, 41.1; H, 4.6; P, 10.1; S, 10.8%. $C_{10}H_{13}O_4N_2PS$ requires: C, 41.7; H, 4.5; P, 10.7; S, 11.1%.

EXAMPLE V

*Preparation of 4-chloro-7-(dimethylphosphinothioyloxy)- 1,2,3-benzothiadiazole*

7-hydroxy-benzothiadiazole (2.5 w.) was dissolved in acetic acid (100 v.) and chlorine (1.2 w.) was passed into the solution. The solution was warmed to 60° C. and then allowed to stand for 2 hours. The solvent was removed and the crude product was washed with benzene. The product was chromatographed on a silica gel column using (a) dichloromethane and (b) an ether/dichloromethane solution (1:10) as eluents.

(a) Gave two fractions: (i) white solid (0.65 w.), M.P. 193° C., and (ii) white solid (0.3 w.), M.P. 191° C.

(b) Gave one fraction: red solid (1 w.), M.P. 207° C. From analysis results, speed of elution, and studies of their IR and NMR spectra the fractions were identified as follows:

(a) (i) 4,6-dichloro-7-hydroxy-1,2,3-benzothiadiazole,
(ii) 6-chloro-7-hydroxy-1,2,3-benzothiadiazole.
(b) 4-chloro-7-hydroxy-1,2,3-benzothiadiazole.

4-chloro-7-hydroxy - 1,2,3 - benzothiadiazole (fraction (b)) was converted into its potassium salt and reacted with dimethyl phosphorochloridothionate in the manner described in Example II. The yield of 4-chloro-7-(dimethylphosphinothioyloxy)-1,2,3-benzothiadiazole, M.P. 76–78° C., was 0.65 w.

Analysis (*percent by weight*).—Found: C, 32.4; H, 3.0; Cl, 11.8; P, 9.5%. $C_8H_8ClN_2O_3PS_2$ requires: C, 30.9; H, 2.6; Cl 11.4; P, 10.0%.

EXAMPLE VI

*Preparation of 6-chloro-7-(dimethoxyphosphinothioyloxy)-1,2,3-benzothiadiazole*

6 - chloro - 7 - hydroxy-1,2,3-benzothiadiazole (fraction (a) (ii) from the chlorination of 7-hydroxy-1,2,3-benzothiadiazole as described in Example V) was converted into its potassium salt and reacted with dimethyl phosphorochloridothionate in the same manner as described in Example II. The yield of the desired product, M.P. 66–67° C. was 0.25 w.

Analysis (*percent by weight*).—Found: C, 31.1; H, 2.6; P, 9.6%. $C_8H_8ClN_2O_3PS$ requires: C, 30.9; H, 2.6; P, 9.9%.

EXAMPLE VII

*Preparation of 6-(methoxyethoxyphosphinothioyloxy)- 1,2,3-benzothiadiazole*

The potassium salt of 1,2,3-benzothiadiazole was reacted with an equivalent amount of methyl ethyl phosphorochloridothionate in methyl isobutyl ketone as solvent. The reaction mixture was filtered and the filtrate washed, then chromatographed in methylene chloride on silica gel. The product was a pale yellow liquid which would not crystallize.

Analysis (*percent by weight*).—Found: C, 37.2; H, 3.9; P, 10.4. $C_9H_{11}O_3S_2N_2P$ requires: C, 37.2; H, 3.8; P, 10.7.

The compounds of the invention have a broad spectrum of insecticidal activity comparable with the widely used insecticide parathion. Thus the compounds effectively kill flies, mosquito larvae, beetles, moth larvae, aphids and mites. Coupled with this broad spectrum of insecticidal activity some of the compounds, unlike parathion, possess a surprisingly low mammalian toxicity; for example 6 - (dimethoxyphosphinothioyloxy)-1,2,3-benzothiadiazole has an acute oral toxicity ($LD_{50}$) to mice of greater than 400 mg./kg. body weight.

The utility of compounds of the invention as insecticides is illustrated by the following insecticidal tests which give an indication of the "kill" obtained with a 0.1% solution of active ingredient in an acetone/emulsifier mixture. The insect species used were houseflies, *Aedes aegypti* mosquito larvae, mustard beetle, diamondback moth larvae, pea aphids, and two-spotted spider mite abbreviated H.f., A.a., M.b., D.b.m., P.a., and T.s.m. respectively. In the table below, A indicates total kill, B partial kill and C no kill of the test insects

| Compound of Example | Kill of Insects | | | | | |
|---|---|---|---|---|---|---|
| | H.f. | A.a. | M.b. | D.b.m. | P.a. | T.s.m. |
| Ia | A | A | A | A | A | A |
| Ib | A | B | A | A | A | A |
| Ic | A | A | A | A | A | A |
| IIa | A | A | A | A | A | A |
| IIb | A | A | A | A | A | A |
| IIc | A | A | A | A | A | A |
| VII | A | A | A | A | A | A |
| IVa | A | C | C | A | A | B |
| IVb | A | C | C | A | A | A |
| IIIa | C | A | A | A | A | B |
| IIIb | A | C | A | B | A | A |
| IIIc | B | A | B | A | A | B |
| V | A | A | A | A | A | A |

According to another feature of the invention, the novel compounds of this invention may be formulated as insecticidal compositions comprising one or more of said compounds and a carrier, a surface active agent, or both a carrier and a surface active agent. The carrier may be a solid or liquid and may be of natural or synthetic origin. The carrier may be a fertilizer. The surface active agent may be a wetting, emulsifying or dispersing agent.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon, resins such as, for example, polyvinyl chloride and polymers and copolymers of styrene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene, and isodurene, coal tar fractions, straight-run petroleum distillates, thermally or catalytically cracked hydrocarbon oils, platformates, refined gas oil, light lubricating oil fractions, refined kerosine, animal and vegetable oils, and organic solvents such as, for example, methanol, ethanol, isopropanol, n-butanol, amyl-alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecule, alkylaryl polyoxyethylene glycol ethers, sorbitan esters of fatty acids containing at least 10 carbon atoms in the molecule, alkylamide sulfonates, and condensation products of ethylene oxide with fatty acid esters, for example the oleic acid ester of anhydrosorbitol. Although both anion- and cation-active surface active agents may be used, the non-ionic surface active agents are preferred.

The compositions of the invention may be concentrates, suitable for storage or transport and containing, for example, from 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing an added emulsifying agent. Aqueous emulsions or dispersions containing an organophosphorus compound as specified above are also within the scope of the invention.

The compositions of the invention may contain in addition to the pesticidal organophosphorus compounds specified above other ingredients, for example, stickers, wetting agents, synergists, stabilizers, or biologically active substances such as other insecticides, fungicides or herbicides. Thus, insecticides such as, for example, 1,1,1-trichloro - 2,2 - bis(p-chlorophenyl)ethane; endrin; dieldrin; aldrin; O,O-dimethyl - O - (2,2-dichlorovinyl) phosphate; O,O-dimethyl - O - (1,2-dibromo-2,2-dichloroethyl)phosphate; O,O - dimethyl - O - [1-methyl-2(1-phenylcarbethoxy)-vinyl] phosphate; O,O-dimethyl-O-[2-N,N-dimethylcarbamoyl-1-methylvinyl] phosphate; rotenone and pyrethrum may be incorporated in the compositions of the invention.

The present invention also relates to a method of combatting insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

We claim as our invention:
1. A phosphorus ester of the formula:

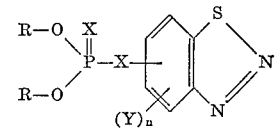

wherein each R represents alkyl of from 1 to 4 carbon atoms, $n$ is zero or one, Y represents middle halogen and each X represents oxygen or sulfur.

2. 5 - (dimethoxyphosphinothioyloxy)-1,2,3-benzothiadiazole.
3. 5 - (diethoxyphosphinyloxy)-1,2,3-benzothiadiazole.
4. 5 - (diethoxyphosphinothioyloxy)-1,2,3-benzothiadiazole.
5. 6 - (dimethoxyphosphinothioyloxy)-1,2,3-benzothiadiazole.
6. 6-(diethoxyphosphinyloxy)-1-2,3-benzothiadiazole.
7. 6 - (diethoxyphosphinothioyloxy)-1,2,3-benzothiadiazole.
8. 4-chloro - 7 - (dimethoxyphosphinothioyloxy)-1,2,3-benzothiadiazole.

No references cited.

ALEX MAZEL, *Primary Examiner.*

ALTON D. ROLLINS, *Assistant Examiner.*